United States Patent [19]

Smiles

[11] Patent Number: 4,598,841
[45] Date of Patent: Jul. 8, 1986

[54] THERMOPLASTIC DISPENSING GUN HAVING A SELF-CONTAINED FILTER AND FLOW CONTROL VALVE

[75] Inventor: Harry Smiles, Sandy Springs, Ga.

[73] Assignee: Nordson Corporation, Amherst, Ohio

[21] Appl. No.: 512,969

[22] Filed: Jul. 12, 1983

[51] Int. Cl.⁴ ............................................. B67D 5/62
[52] U.S. Cl. .................................. 222/146.5; 222/189
[58] Field of Search ............... 222/146.1, 146.2, 146.5, 222/189; 137/454.5, 549; 425/197, 199

[56] References Cited

U.S. PATENT DOCUMENTS

| | | | |
|---|---|---|---|
| 2,771,905 | 11/1956 | Griswold | 137/454.5 |
| 3,307,217 | 3/1967 | Cameron | 425/197 X |
| 3,826,224 | 7/1974 | Baker et al. | 222/146.5 X |
| 3,942,687 | 3/1976 | Walus | 222/146.5 |

*Primary Examiner*—Joseph J. Rolla
*Assistant Examiner*—Nils Pedersen
*Attorney, Agent, or Firm*—Michael L. Gill; Stephen T. Belsheim

[57] ABSTRACT

A modular apparatus for extruding a pressurized molten thermoplastic material comprising a service block module which defines a first passage for the material and includes front and rear surfaces. A removable gun module is attachable to the front surface of the service block module. A combination filter-control valve assembly is contained within the service block module. The assembly communicates with the first passage so as to filter and control the flow of material to the gun module.

2 Claims, 2 Drawing Figures

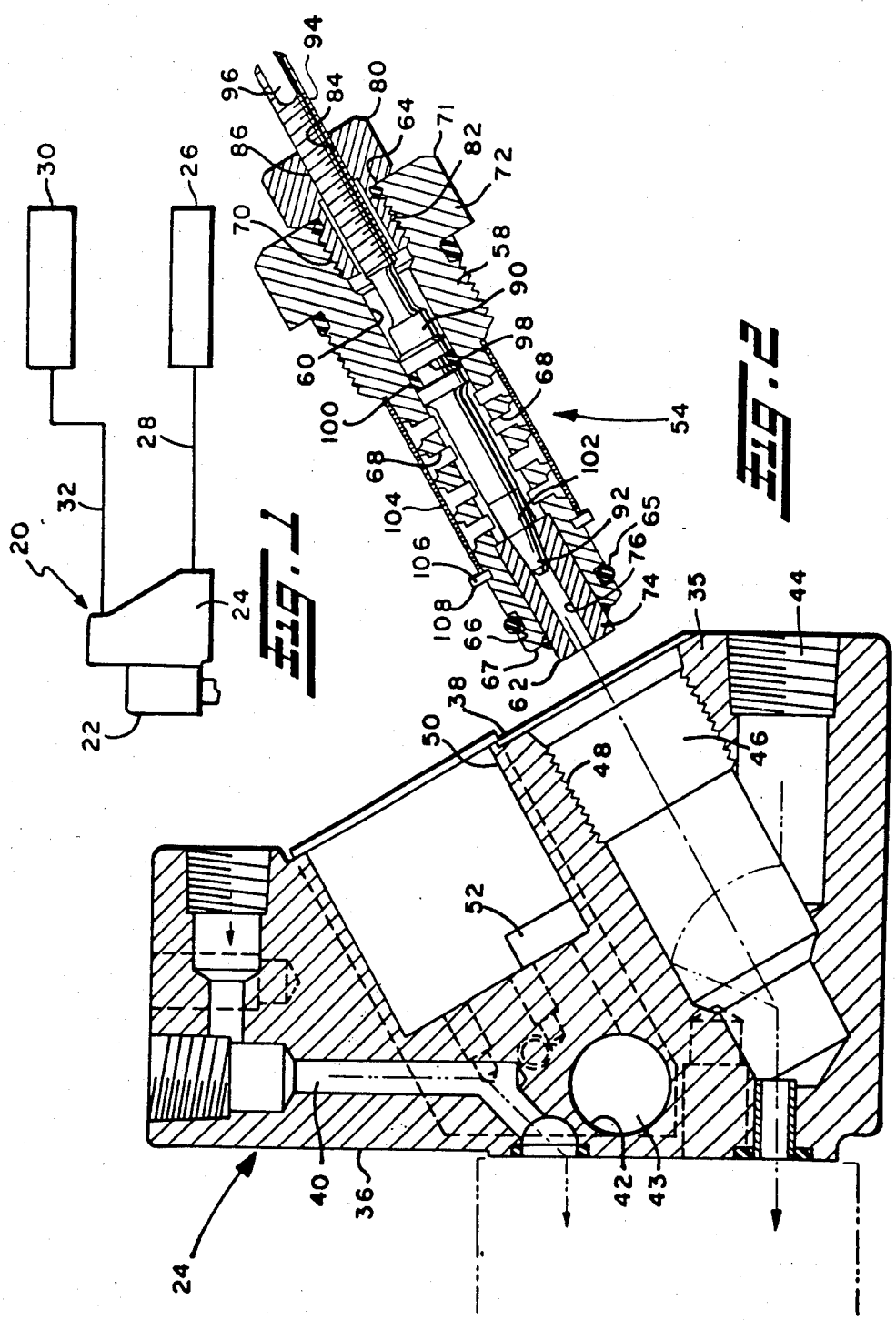

THERMOPLASTIC DISPENSING GUN HAVING A SELF-CONTAINED FILTER AND FLOW CONTROL VALVE

BACKGROUND OF THE INVENTION

The invention relates to dispensers of thermoplastic material, and in particular, to a dispensing gun assembly having a filter and flow control valve contained in the service block adjacent the gun module.

In the past, applications requiring both filtering and flow control capabilities have used separate modules to house the filter and flow control valve. By using additional modules, additional fluid and electrical connections are required. The existence of these additional modules, and their accompanying connections, provides additional locations for problems to arise. For example, a faulty electrical connection could cause the electric heaters in a module to become inoperative. The result being that the module becomes "cold" thereby stopping the flow of molten adhesive through the entire system. Additional fluid connections provide additional locations for cold joints or fluid leaks. Additional modules and connections increase the difficulty associated with servicing the assembly.

SUMMARY OF THE INVENTION

The invention is directed to a modular apparatus for extruding a molten thermoplastic material from a pressurized source. The apparatus comprises a service block module which defines a first passage for the molten thermoplastic material. The service block includes front and rear surfaces. A removable gun module is attachable to the front surface of the service block. A combination filter-control valve assembly is contained within the service block. The combination filter-control valve assembly fluidly communicates with the first passage so as to filter and control the flow of molten material to said gun module.

BRIEF DESCRIPTION OF THE DRAWINGS

Further objects and features of the invention will be apparent from the following description of an embodiment of the invention in connection with the accompanying drawings. It should be understood that this description is in no way limiting and that various changes may be brought to the disclosed embodiment without departing from the scope of the invention.

FIG. 1 is a schematic view of a hot melt adhesive application assembly using the modular extrusion apparatus of the invention; and FIG. 2 is a cross-sectional view of the service block module of FIG. 1 with the combination filter-control valve blown apart from the service block module.

DETAILED DESCRIPTION OF A SPECIFIC EMBODIMENT

The complete dispensing assembly is schematically illustrated in FIG. 1. The dispenser assembly is generally designated as 20. Dispenser 20 includes a gun module 22 and a service block module 24. Gun module 22 may be the gun module from a hot melt adhesive dispensing gun such as the Model H-20 or H-200 made and sold by Nordson Corporation of Amherst, Ohio 44001. U.S. Pat. No. Re. 27,865 to Baker et al. for an "Applicator Having A Fixed Module With Static Parts and A Removable Module with Moving Parts" also shows a hot melt adhesive dispensing gun. Gun module 22 and service block module 24 are attached together in the same fashion as are the analogous modules described in U.S. Pat. No. Re. 27,865.

Service block module 24 is connected to an adhesive source 26 via hose 28 and to an air supply 30 via line 32.

Referring to FIG. 2, service block module 24 includes a body 35 having front and rear surfaces 36 and 38, respectively. Body 35 contains an air passage 40 that provides communication through body 35. Line 32 is connected to air passage 40. It is through air passage 40 that control fluid is supplied to gun module 22.

Service block body 35 includes a heater bore 42 in which a heater may be located. For clarity, the heater is not illustrated. Service block body 35 further includes a well 50 in its rear surface 38. A temperature control assembly 52 is located within well 50. Temperature control assembly 52 is operatively connected to the heater and controls the operation thereof.

Service block body 35 also contains an adhesive passage 44 that provides communication through body 35. Hose 28 is connected to adhesive passage 44. It is through adhesive passage 44 that molten hot melt adhesive is supplied to gun module 22.

Service block body 35 further includes a filter-control valve assembly passage 46. The control longitudinal axis of passage 46 is disposed at an acute angle relative to the central longitudinal axis of passage 44. Passages 44 and 46 intersect one another.

A combination filter-control valve 54 is positioned within passage 46 so as to filter and control the flow of molten hot melt adhesive to gun module 22. Combination valve 54 includes an elongate body 58 having a control bore 60. Bore 60 has opposite ends 62 and 64. An external annular groove 66 is cut into elongate body 58 near the one end 67 thereof. An O-ring 65 is positioned within annular groove 66. O-ring 65 seals between filter-control valve 54 and passage 46.

Elongate body 58 further includes a plurality of cross slots or ports 68 that provide communication between bore 60 and the external surface of elongate body 58. The other end 71 of elongate body 58 is hexagonally shaped to facilitate its being gripped by a wrench or other like tool. Elongate body 58 further includes external threads 70 positioned inwardly of hexagonal section 72.

A seat 74 having a control passage 76 is positioned within control bore 60 adjacent one end 62 thereof. A nut 80 having external threads 82 and a central bore 84 is threadedly attached to body 58 adjacent end 71.

A needle valve 90 has opposite ends 92 and 94. Needle valve 90 has external threads 96 adjacent end 94 thereof. Needle valve 90 also contains a notch 96 at end 94 thereof. Needle valve 90 includes an annular groove 98 with an O-ring 100 contained therein. O-ring 100 seals between valve 90 and bore 60. Needle valve 90 has a tapered portion 102 adjacent the other end 92 thereof. The distal end of tapered portion 102 is capable of seating against seat 74 so as to create a fluid-tight seal.

Needle valve 90 is threadedly connected to nut 80. More specifically, external threads 96 of valve 90 engage internal threads 86 contained within bore 84 of nut 80.

A filter screen 104 is maintained between shoulder 105 and a split ring 106 contained within groove 108.

In operation, molten hot melt adhesive enters service block module 24 via adhesive passage 44. The molten adhesive flows into the intersection between passages 44 and 46. The molten adhesive passes through filter screen 104 so that the molten adhesive is filtered.

Molten adhesive then flows through cross slots 68 into bore 60 and past tapered portion 102. If needle valve 90 is not seated against seat 74, molten adhesive flows into and through control passage 76 and onto gun module 22. As can be appreciated, the flow rate of molten adhesive will increase as the distance between the seat and needle valve increases. The distance between the seat and the needle valve can be changed by rotating needle valve 90 in one direction or the other. Generally, a tool will be received within notch 96 to rotate valve 90. If the needle valve is seated against the seat, then the flow of molten adhesive to the gun module will cease.

While I have disclosed specific embodiments of my invention, persons skilled in the art to which this invention pertains will readily appreciate changes and modifications which may be made in the invention. Therefore, I do not intend to be limited except by the scope of the following appended claims.

What is claimed is:

1. A modular apparatus for extruding a molten thermopolastic material from a pressurized source, the apparatus comprising:
    a service block module defining a first passage for the molten thermoplatic material, said service block module including front and rear surfaces;
    a removable gun module attachable to the front surface of said service block module;
    said service block module further defining a second passage acutely disposed with respect to said first passage, said second passage opening at the rear surface, said first and second passages intersecting with each other;
    a heating means contained within said service block module;
    a filter positioned within said second passage so as to communicate with incoming molten material; and
    a flow control assembly positioned within said second passage so as to communicate with incoming molten material, said flow flow control assembly including;
        an elongated body with a central bore and a plurality of ports communicating with said bore,
        a valve seat positioned within said bore, and
        an adjustable needle valve movable between one position in which said needle valve seats against said valve seat ceasing the flow of molten material to said gun module and another position in which said needle valve is spaced apart from said valve seat a selected distance thereby allowing a selected flow of molten material to said gun module.

2. The modular apparatus of claim 1 wherein said filter comprises a cylindrical screen, said screen surrounding said elongate body adjacent said ports.

* * * * *